United States Patent [19]
Chamberlin et al.

[11] Patent Number: 5,602,330
[45] Date of Patent: Feb. 11, 1997

[54] NON-CONTACT FORCE MICROSCOPE HAVING A COAXIAL CANTILEVER-TIP CONFIGURATION

[75] Inventors: Ralph V. Chamberlin, Tempe, Ariz.; Anthony DiCarlo, Holladay, Utah

[73] Assignee: Arizona Board of Regents acting on behalf of Arizona State University, Tempe, Ariz.

[21] Appl. No.: 449,923

[22] Filed: May 25, 1995

Related U.S. Application Data

[62] Division of Ser. No. 241,745, May 12, 1994, Pat. No. 5,509,300.

[51] Int. Cl.$^6$ .................................................. G01B 5/28
[52] U.S. Cl. ........................................................ 73/105
[58] Field of Search ............................... 73/105; 250/306

[56] References Cited

U.S. PATENT DOCUMENTS

| | | | |
|---|---|---|---|
| 4,992,659 | 2/1991 | Abraham et al. | 250/306 |
| 5,193,383 | 3/1993 | Burnham et al. | 73/105 |
| 5,198,715 | 3/1993 | Elings et al. | 250/306 |
| 5,254,854 | 10/1993 | Betzig | 250/234 |
| 5,371,365 | 12/1994 | Watanabe et al. | 250/306 |
| 5,391,871 | 2/1995 | Matsuda et al. | 73/105 |

FOREIGN PATENT DOCUMENTS 488133  6/1992  European Pat. Off. ............. 73/105

OTHER PUBLICATIONS

Martin et al., "Method For Imaging Sidewalls by Atomic Force Microscopy", Appl. Phys. Lett., vol. 64, No. 19, 09 May 1994, pp. 2498–2500.

Melmed, "The Art and Science and Other Aspects of Making Sharp Tips", J. Vac. Sci. Technol., B9, No. 2, Mar./Apr. 1991, pp. 601–608.

N. Burnham et al., "Measuring the Nanomechanical Properties and Surface Forces of Materials Using an Atomic Force Microscope", J. Vac. Sci. Technol. A7 (4), Jul./Aug. 1989, pp. 2906–2913.

R. Erlandsson et al., "Atomic Force Microscopy Using Optical Interferometry", J. Vac. Sci. Technol., A6 (2), Mar./Apr. 1988, pp. 266–270.

C. Mate et al., "Atomic–Scale Friction of a Tungsten Tip on a Graphite Surface", Physical Review Letters, vol. 58, No. 17, 26 Oct. 1987, pp. 1942–1945.

G. Meyer et al., "Simultaneous Measurement of Lateral and Normal Forces with an Optical–Beam–Deflection Atomic Force Microscope", Appl. Phys. Lett. 57 (20), 12 Nov. 1990, pp. 2089–2091.

D. Rugar et al., "Force Microscope Using a Fiber–Optic Displacement Sensor", Rev. Sci. Instrum. 59 (11), Nov. 1988, pp. 2337–2340.

K. Takata et al., "Tunneling Acoustic Microscope", Appl. Phys. Lett. 55 (17), 23 Oct. 1989, pp. 1718–1720.

H. Wickramasinghe, "Scanned–Probe Microscopes", Scientific American, Oct. 1989, pp. 98–105.

Primary Examiner—Hezron E. Williams
Assistant Examiner—Daniel S. Larkin
Attorney, Agent, or Firm—Richard R. Mybeck; Peter B. Scull

[57] ABSTRACT

The present invention comprises a highly sensitive non-contact force microscope having a coaxial cantilever-tip configuration and a method of forming such configuration. The non-contact microscope obtains high resolution graphical images of a sample surface topography, and/or other properties thereof including its electrostatic, magnetic, or Van der Waals forces.

7 Claims, 6 Drawing Sheets b. Observed Line Profile.

c. Calculated Line Profile.

5,602,330

NON-CONTACT FORCE MICROSCOPE HAVING A COAXIAL CANTILEVER-TIP CONFIGURATION

Some of the work resulting in this invention was performed under Office of Naval Research Grant No. N 00014-88-K-0094 and the United States may have certain rights to this invention.

This application is a divisional of pending U.S. patent application Ser. No. 08/241,745 filed on May 12, 1994 for NON-CONTACT FORCE MICROSCOPE HAVING A COAXIAL CANTILEVER-TIP CONFIGURATION, now U.S. Pat. No. 5,509,300.

INTRODUCTION

This invention relates generally to the field of force microscopy and more particularly to a novel and unique force microscope having a coaxial cantilever-tip configuration for ultra sensitive non-contact detection of forces and force gradients. This configuration, with the cantilever and tip having a substantially common axis, facilitates the practice of non-contact force microscopy, such as in the measurement of long-ranged electrostatic interactions, Van Der Waals forces, magnetic forces, and the like.

BACKGROUND OF THE INVENTION

Scanning probe microscopy refers generally to a class of high resolution techniques for studying surfaces at or near atomic resolution. Several different techniques which produce these results have been described in the prior art.

One of the first such techniques is scanning tunneling microscopy (STM), which utilizes a sharpened tip held in electrical contact (circa 0.1 to 1 nm) with a sample surface, and biased to produce a current between the tip and the surface. Current variations caused by differences in the distance between the tip and the surface may be plotted to yield a topographical representation of the surface. This technique is described in Binnig et al. (U.S. Pat. No. 4,343,993). In Binnig, the tip and the sample must be electrically conductive to allow current flow between them, and as such, limits the application of this technique. Another limitation is that the STM is sensitive only to the charge density at the surface of the sample.

A later variant of scanning probe microscopy was described by Binnig, Quate, and Gerber who reported the earliest atomic force microscope (AFM). (See: Binnig et al., *Physics Review Letters*, Vol. 56, page 930 (1986)). This early atomic force microscope, as further described in Binnig (U.S. Pat. No. 4,724,318), utilizes a small, diamond microprobe tip mounted on the side of a soft cantilever, so that the axes of the cantilever and the tip are substantially perpendicular to one another. The tip is brought into close proximity (0.1 to 1 nm) to the sample, with the cantilever disposed parallel to the sample, so that the repulsive forces between the tip and surface cause deflections of the cantilever.

In the Binnig AFM application, the tip is attached to a conductive cantilever which is interposed between the sample surface and a standard STM tip. A tunneling current is then maintained between the AFM cantilever and the STM tip, so that the sample need not be conductive. Changes in the current flow between these two elements provide a sensitive measure of the deflections of the AFM cantilever, and hence of the forces between the sample surface and the tip. More recent and more common AFM applications use other techniques, such as optical methods, to measure cantilever deflection.

In one mode of operation, changes in the deflection of the cantilever are measured as the tip is rastered over a sample. In practice, the tip scans the sample in very close proximity (<1 nm) to the sample surface, so that the deflections of the cantilever are due to the repulsive forces between the atoms on the sample and the atoms on the apex of the tip.

As was immediately recognized by Binnig et al., a generally superior mode of operation utilizes dynamical techniques to reduce noise, and thereby increase sensitivity. By vibrating the cantilever perpendicular to the plane of the sample (i.e. vertically relative to a horizontally disposed sample) at the mechanical resonance frequency of the cantilever, noise is reduced by the quality factor of the mechanical resonator and by the narrow frequency range of the measurement. A possible disadvantage of this "resonance enhancement" configuration is that it is sensitive primarily to force gradients in the direction of vibration, the net force perpendicular to the sample surface (Z-direction) must still be determined from the static deflections of the cantilever.

Furthermore, a fundamental drawback of the Binnig AFM geometry is that the tip can only be vibrated in a direction that is substantially perpendicular/to the sample surface. Thus, although forces between the tip and sample act in all directions of XYZ space, only the force gradients in the direction of oscillation (Z-direction) can be sensed by a cantilever that is oriented parallel to the sample surface; important information about the forces in the X- and Y-directions cannot be resolved.

Mate et al. (*Phys. Rev. Lett.*, 59 pg. 1942 (1987)) describe a frictional force microscope for measuring lateral forces (see also Meyer and Amer, *Appl. Phys. Lett.*, vol. 57 pg. 2089 (1990) and Marti et al., *Nanotechnology*, vol. 1 pg. 141 (1990)). The cantilever-tip configuration of these frictional force microscopes is similar to that of the Binnig AFM (with the cantilever axis oriented substantially parallel to the sample's surface), but lateral forces are measured from the torsional rotation of the cantilever about its axis. This configuration, however, has some fundamental drawbacks that limits its sensitivity to lateral forces. First, the cantilever spring constant is always stiffer against torsional rotation than it is against normal displacement. Second, it is generally difficult to excite torsional modes of vibration, hence no resonant enhancement of the lateral force resolution has been achieved with these microscopes. Finally, only forces in one lateral direction (for example, in the X-direction, but not the Y-direction) can be measured at a time.

Taubenblatt (*Appl. Phys. Lett.*, vol. 54 page 801 (1989)) describes a different configuration for atomic force microscopy. The Taubenblatt microscope utilizes a vertically mounted STM tip, which can be made to vibrate laterally over the surface of a horizontally disposed sample. Changes in the vibrational frequency of the STM tip provide information about changes in the lateral atomic forces between the tip and the sample, thus rendering simultaneous STM and AFM images. The Taubenblatt STM/AFM microscope requires that the tip and sample be made from electrically conductive materials. Furthermore, the tip and sample must carry a possibly damaging electrical current. Finally, during imaging, the tip must be kept in close proximity to the sample surface, so it cannot be used for non-contact force microscopy.

Pohl (U.S. Pat. No. 4,851,671) describes a similar configuration for the measurement of lateral atomic forces. The Pohl AFM utilizes a rigid microprobe tip attached to (or etched from) a quartz crystal oscillator. In practice, the tip is brought into close proximity to the sample (<1 nm), and the tip is vibrated laterally across the sample surface. Changes in the resonance frequency of the quartz crystal provide information about the force gradients at the surface in the direction of oscillation.

A fundamental drawback of the Pohl AFM is that the oscillator consists of a quartz crystal, which has a static spring constant of approximately $4 \times 10^6$ N/m. Generally, such a "stiff" spring constant AFM requires complex instrumentation to achieve the sensitivity of a typical "soft" cantilever (0.01–100 N/m) AFM. Specifically, Pohl uses a sophisticated frequency counter, capable of resolving changes of 2 parts per billion in the frequency of the crystal, for sensitivity ($2 \times 10^{-12}$ N) comparable to that of a simple "soft" cantilever AFM. Furthermore, such frequency resolution requires relatively long integration times (about 1 second per point), which limits the scan speed to several minutes per line. Finally, because of the very high spring constant of the quartz crystal oscillator, the Pohl microscope does not interact detectably with the sample until the tip is in close proximity (within 0.1 to 1 nm) of the sample surface, thus the Pohl microscope is limited to the measurement of relatively strong interatomic forces.

Sometimes it is desirable to measure other types of forces from a sample. Abraham (U.S. Pat. No. 4,992,659) teaches an electro-magnetic force microscopy means and method whereby Lorentz forces arising from the interaction of a current interposed between the metallic conductive tip and a conductive sample surface are measured. Lorentz forces are those forces that arise when the current flow between the tip and sample of a STM system are deflected by a magnetic field.

Abraham's preferred tip is non-magnetic to eliminate extraneous forces created by a magnetic tip. When an STM current is interposed between the conductive tip and the conductive sample, Lorentz force (electro-magnetic) induced deflections of the vibrating tip can be measured. The strength of the force, and hence the magnitude of the deflection, is plotted using laser positioning instrumentation. Fundamental limitations of the Abraham Lorentz force microscope include that the sample must be conductive, and that a potentially damaging and invasive current must pass through the surface.

Furthermore, as in the other prior art techniques for contact AFMs described above, the Abraham microprobe tip must be placed at a distance of approximately 1 nm (or less) from the surface to be studied. To obtain a complete image, this close proximity must be maintained throughout the scan. Thus, to follow the contours of a sample, rapid motion of the tip assembly must be made to avoid catastrophic impingements (crashes) of the tip onto the sample. This indicates that only microscopically smooth regions of a surface may be investigated successfully, which is an obvious deficiency when the investigator desires to study an irregular surface.

Some improvements in the prior art have been made by operating standard (perpendicular cantilever-tip configuration) AFMs in non-contact mode. In non-contact mode, the AFM tip is held farther from the sample (1–100 nm), where a diversity of longer-ranged interactions such as magnetic, Van der Waals, or electrostatic dipole forces may be resolved. In general, these long-ranged forces are weaker and more dispersed than the inter-atomic forces measured by contact AFM, which thus has the advantage of diminishing the possibly destructive forces that the tip imparts on the sample, but demands that maximum sensitivity be available for near atomic resolution.

Any force microscope that incorporates a tunneling current between the sample and tip (such as the Taubenblatt AFM/STM or the Abraham near-field Lorentz magnetic force microscope) cannot be operated in non-contact mode. Moreover, any force microscope with limited force resolution (such as the Pohl oscillating quartz AFM) cannot be operated in non-contact mode. All prior art AFMs that have been operated in non-contact mode have embodied the original Binnig configuration of a tip that is substantially perpendicular to the cantilever, but this configuration has some fundamental drawbacks. First, the tip can only be vibrated in a direction substantially perpendicular to the surface of the sample, hence the primary contrast mechanism is due only to force gradients in the Z-direction. Second, information about the X- and Y-forces along the surface of the sample can only be obtained by using less sensitive torsional force sensing. Third, large variations in the force between the surface and the tip often cause uncontrolled deflections of the cantilever toward the sample surface, resulting in catastrophic tip-to-sample collisions (tip crashes). To reduce the incidence of tip crashes, cantilevers that are relatively rigid must be used, which limits the ultimate sensitivity of all force microscopes that are based on the original Binnig AFM configuration.

Although the prior art has addressed certain limitations in the art of scanning probe microscopy, none overcome all of the disadvantages. Accordingly, the present invention is directed toward providing to the art of force microscopy a novel means of producing high resolution analysis of a surface, either conductive or non-conductive, at a tip distance which will not contact (through electric current or inadvertence) the surface under study. A further goal is to provide a tip configuration which allows for measurement of both axial and multi-directional lateral forces, is effective in ambient conditions, is sensitive to small force gradients, and can be obtained using inexpensive laboratory instrumentation.

BRIEF SUMMARY OF THE INVENTION

The present invention provides a new and highly sensitive non-contact force microscope which overcomes substantially all of the deficiencies found in the prior art. More particularly, the present invention provides a new, highly sensitive and versatile configuration for the cantilever and microprobe tip in such a microscope. The novel configuration has a sharpened tip that is attached to (or formed from) the end of a cantilever, so that the cantilever and tip have substantially a common axis, and this common axis is oriented substantially perpendicular to the surface of the sample to be imaged. Thus, the geometry may be described as a coaxial cantilever-tip configuration, which when mounted vertically over the surface of a horizontally disposed sample, is made to vibrate horizontally (laterally) over the surface, somewhat like a tiny pendulum. Further, the tip is disposed at non-contact distances (that is greater than 1 nm) from the sample, and is most useful in measuring forces other than the repulsive atomic forces which dominate at distances of less than 1 nm from the sample. Furthermore, when the tip is magnetized, the structure of the present invention may be adapted for magnetic force microscopy, as described by DiCarlo et al., *Applied Physics Letters*, vol. 61 pg. 2108 (1992).

The coaxial cantilever-tip configuration of the present invention has several fundamental advantages over prior art force microscope designs.

First, the microscope embodying the present invention is especially and unexpectedly useful as a non-contact force microscope, where the tip is held at relatively large distances (1–100 nm) from the sample surface. As will be shown, non-contact force microscopy has some fundamental advantages over prior techniques, which were limited to imaging the repulsive forces between overlapping atoms. At sample-to-tip distances of greater than 1 nm, other, often more interesting interactions such as magnetic, Van der Waals, or electrostatic forces may be imaged. Such long-ranged and dispersed interactions reduce the possibly damaging influence of the tip on the sample, and similarly reduce the need to have a microscopically clean surface.

Second, the coaxial cantilever-tip configuration is intrinsically simpler and ultimately more sensitive than prior designs. Using inexpensive laboratory instrumentation, a simple non-contact magnetic force microscope that gives state-of-the-art sensitivity has been obtained.

Third, similar to the fact that the period of a pendulum depends on the force of gravity, the vibration frequency of the coaxial cantilever-tip configuration depends on the normal (Z-component) force out of a sample. This advantage is primarily useful for characterizing large homogeneous regions of a sample, since the contrast mechanisms of microscopic structures are usually dominated by force gradients which are measurable with this configuration.

Fourth, since the tip is oscillated laterally with respect to the sample's surface, the primary contrast mechanism is due to changes that occur laterally across the sample. Often it is these lateral changes that are of primary interest. For example, in standard magnetic recording technology, the recorded signal consists of lateral changes in the magnetization across the magnetic recording media. The coaxial cantilever-tip configuration provides the most direct microscopic measurement available of such recorded signals.

Fifth, the tip may be oscillated in the X- or Y-directions, providing information about the magnitude and direction of the lateral forces at the surface of a sample, with a single, highly sensitive force cantilever. In fact, by adding a second deflection detector, it would be possible to simultaneously obtain the force gradients in both the X- and Y-directions.

Lastly, the coaxial cantilever-tip configuration described herein, which is oriented substantially perpendicular to a sample's surface, prohibits deflections towards the surface, thereby reducing the incidence of tip crashes and permitting the use of ultra-small spring constant cantilevers for superior force sensitivity. It is true that for sufficiently strong lateral forces, a soft cantilever may be irreversibly displaced along the sample's surface; but since these deflections do not result in a potentially damaging tip crash, they do not seriously affect the imaging process. Furthermore, for the coaxial cantilever-tip configuration, the primary microscopic contrast mechanism is provided by these same lateral forces, thus a stiffer cantilever can be used without sacrificing image contrast.

It is therefore the principal object of the present invention to provide a novel and unique non-contact force microscope, having a coaxial cantilever-tip configuration, which is highly sensitive to both the normal forces from a sample and multi-directional lateral force gradients, thereby providing high resolution topographical data, or other force data such as magnetic or electric field measurements, from the sample under study.

It is a further object of the present invention to provide a coaxial cantilever-tip configuration for a non-contact force microscope whose oscillations may be measured in any lateral direction across a sample's surface, thereby yielding valuable directional information about the forces.

Another object of the present invention is to provide a coaxial cantilever-tip configuration for a non-contact force microscope which has a low static spring constant to efficiently yield increased measurement precision, and which is particularly sensitive to small force gradients.

A still further object of the present invention is to provide a coaxial cantilever-tip configuration for a non-contact force microscope which is relatively stiff perpendicularly relative to the sample, to prevent surface collisions (tip crashes), and yet remain highly sensitive to the lateral force gradients.

Still another object of the present invention is to provide a force microscope which operates at non-contact distances, minimizes tip-to-sample invasiveness, is effective with conductive and nonconductive sample materials, and which is particularly useful for measuring lateral force gradients.

Yet another object of the present invention is to provide a non-contact force microscope which is operational under normal atmospheric and temperature conditions.

These and still further objects, as shall hereinafter appear, are readily fulfilled by the present invention in a remarkably unexpected manner as will be readily discerned from the following detailed description of an exemplary embodiment thereof, especially when read in conjunction with the accompanying drawings in which like numbers bear like indicia throughout the several views.

DESCRIPTION OF THE PREFERRED EMBODIMENT

This invention relates generally to the field of scanning probe microscopy and more particularly to a non-contact force microscope utilizing a novel coaxially cantilevered microprobe tip configuration for measuring a plurality of properties, including certain forces and force gradients of a sample.

Figure 1:
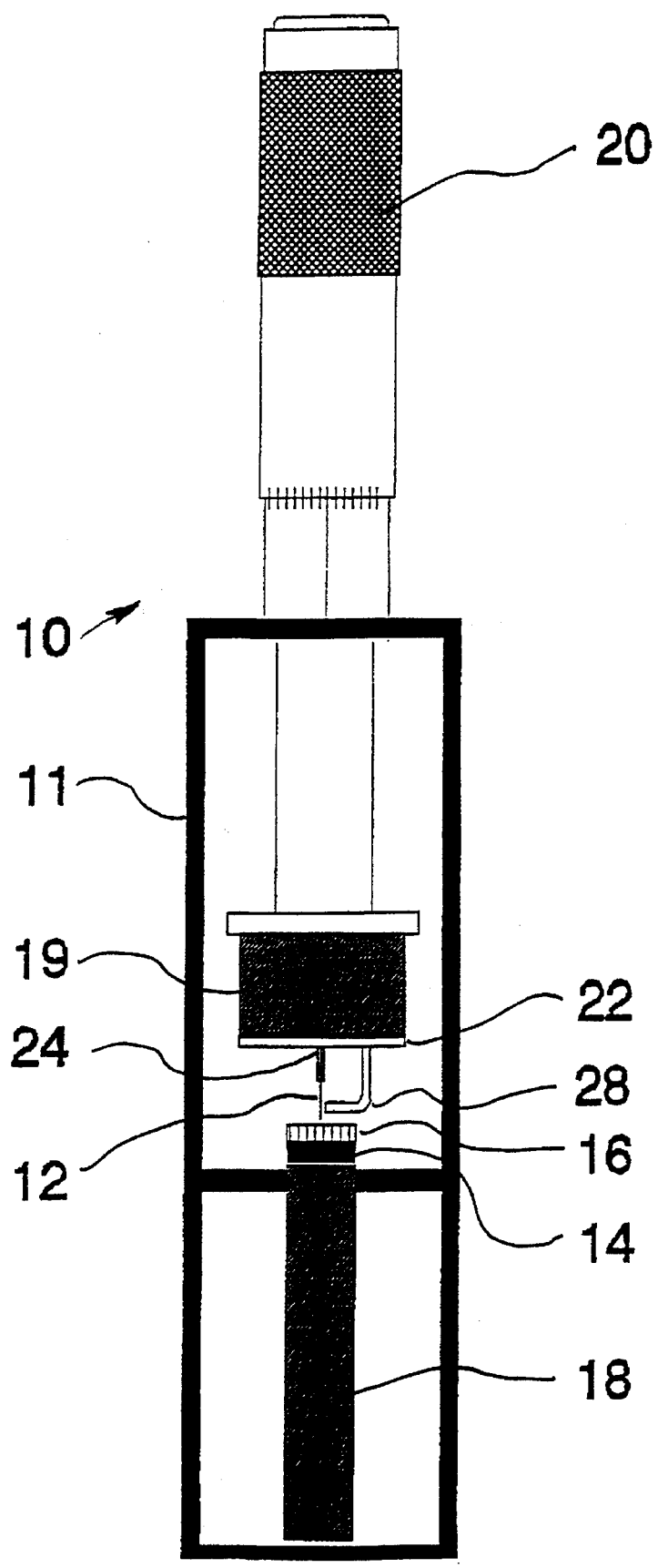
FIG. 1 is a vertical cross sectional view of a force microscope, in combination with a coaxial cantilever-tip configuration, embodying the present invention.

More particularly, the present invention pertains to a novel non-contact force microscope identified by the general reference 10 as shown in FIG. 1, and comprises a support structure 11, and a coaxial cantilever-tip configuration 12 shown in its installed position relative to support structure 11 in force microscope 10. A stage 14 is disposed in operative relationship on support structure 11 beneath cantilever-tip configuration 12 to support sample 16. Piezo-electric-tube (PZT) drives 18, 19, micrometer 20, rigid insulating disk 22, and collar 24 are also attached, directly or indirectly, to support structure 11 of force microscope 10 as shown.

Figure 2:
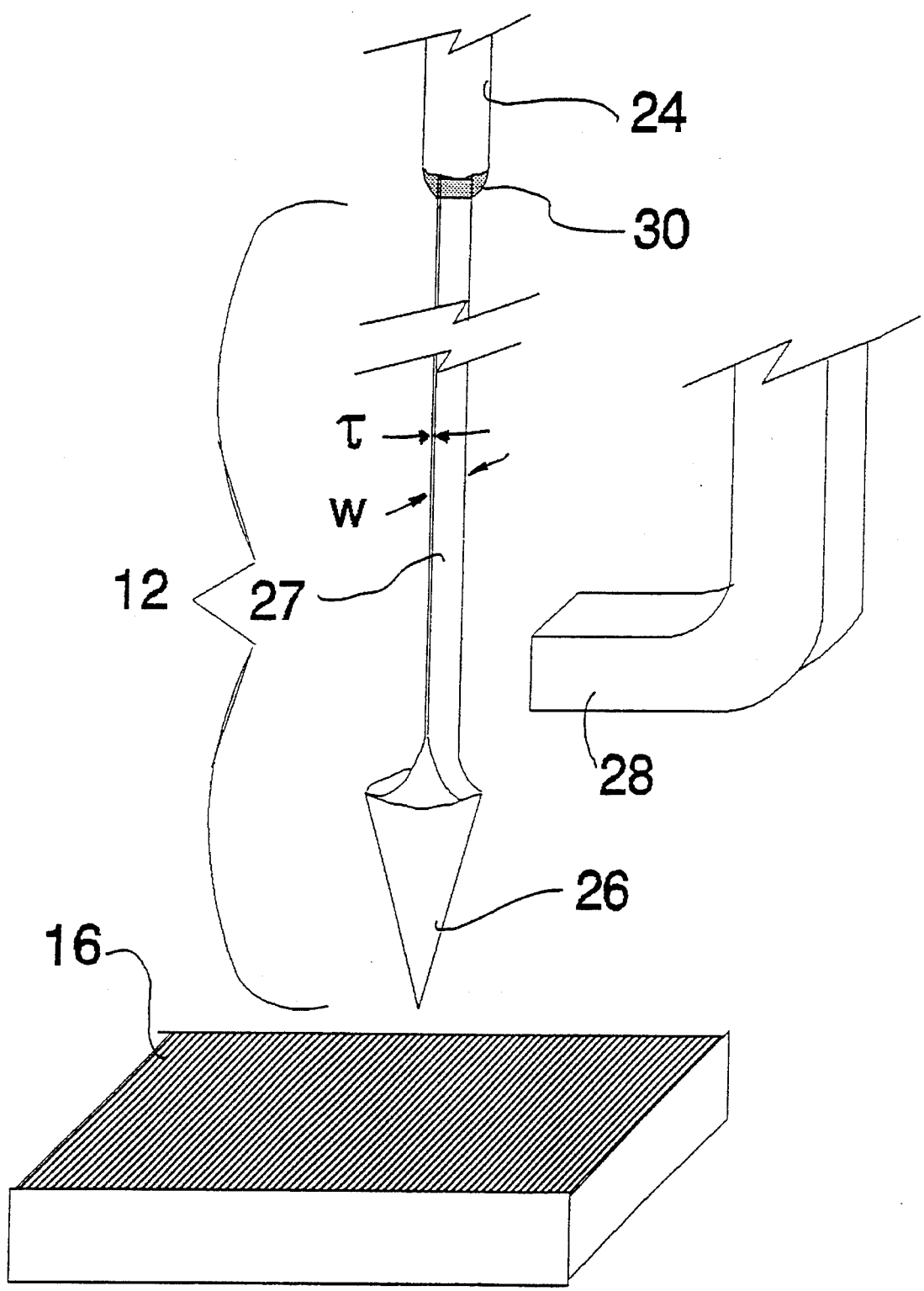
FIG. 2 is a perspective view of a coaxial cantilever-tip configuration and capacitance probe embodying the present invention.

In a preferred embodiment of the present invention as shown in FIGS. 1 and 2, a cantilever-tip configuration 12 is formed from a single nickel wire having an electrochemically etched sharpened tip portion 26 formed at one end thereof (tip portion 26 is shown, but need not necessarily be cone-shaped). The remainder of the wire is shaped as an elongated cantilever portion 27 with an unsharpened, blunt end portion (not shown) for insertion in collar Cantilever portion 27 has a longitudinally extending axis which is in coaxial, operatively associated relationship with tip portion 26. Cantilever portion 27 is also chemically etched to reduce the cantilever stiffness. For scanning a sample 16, configuration is positioned in non-contact responsive relationship to sample as shown in FIG. 2. Tip portion 26 may also be formed of magnetized nickel which allows the invention to operate as a magnetic force microscope to measure magnetic forces acting on tip portion 26 due to the interaction of the magnetic fields of sample 16 with tip portion Force microscope 10 further comprises a capacitance probe 28 which measures the differential capacitance relative to cantilever portion 27 as configuration 12 oscillates over a sample 16. A second capacitance probe (not shown) can be added to measure a second differential capacitance relative to tip portion 26. Well known capacitance measuring and graphical imaging means (not shown) can be used to record and display the capacitance data from either or both capacitance probes (if used), in understood fashion. Technology exists which makes it possible to electrically combine the data from both probes (if used), for display on a single display device. Alternatively, a second, discrete measuring and imaging means may be used to simultaneously and independently record the data from a second capacitance probe (if such is used). Of course, the methods for capacitance retrieval, cumulation and display from the inputs are known or are simply obtainable by those skilled in the art and, without further description, such methods are thus incorporated herein. Thus, multi-dimensional forces can be measured as described below.

The key feature of the present invention is the simple, yet effective, coaxial structural orientation of cantilever-tip configuration 12. In a preferred embodiment, as shown in FIGS. 1 and 2, cantilever portion 27 and tip portion 26 are formed from a single piece of wire. This process involves a sequence of electrochemical etching and mechanical processing. Ferromagnetic nickel (Ni) is a preferred material of the wire for magnetic force microscopy, and a 70% nitric acid solution is a suitable etchant. Starting with a piece of wire approximately 1-mil (0,001"≈0.0025 cm) in diameter and 2 cm long, the finished shape of configuration 12 is as shown with a sharpened tip portion 26 at the end of a cantilever portion 27 with an ultra-soft spring constant of ~$10^{-3}$ N/m.

The formation process used in the preferred embodiment of cantilever-tip configuration 12 is substantially as follows. First, a sharpened tip portion 26 is formed at one end of a wire by applying a positive DC voltage to the wire in an acid solution. The unsharpened, blunt end portion (not shown) of the wire is then inserted into a 0.1 mm I.D., 3 mm long stainless steel collar 24. At this point, collar 24 is not yet attached to microscope 10. Rather, collar 24 facilitates handling the wire during processing and eventually serves to hold configuration 12 in rigid insulating disk 22 in support structure 11 of microscope 10.

Next, approximately 3 mm of the sharpened end of the wire (including tip portion 26) is pressed between two pieces of mirror-finish carbide in a vise (not shown), to a thickness of about $5 \times 10^{-5}$ cm. Cantilever portion 27 is inserted through a 1 mm I.D., 1 mm long TEFLON® tube filled with 70% nitric acid, leaving about 0.1 mm of sharpened tip portion 26 protruding out of the etchant solution. During this final etching process, a permanent magnet is placed close to the protruding tip portion 26, providing tension to help prevent delicate cantilever portion 27 from bending, and ensuring magnetic alignment along the axis of cantilever-tip configuration 12. After a specific interval of time (on the order of 30 seconds, depending on desired cantilever stiffness), configuration 12 is carefully removed and placed in an acetone bath to prevent further etching.

Finally, silver paint 30, which acts primarily as an adhesive or glue, is applied to collar 24, and cantilever-tip configuration 12 is pulled further into collar 24 until a ~0.05 cm amount of configuration 12 is left protruding out of collar 24. As paint 30 dries and thus rigidly secures configuration 12 within collar 24, cantilever-tip configuration 12 is carefully straightened by manipulating it with tweezers at the base of cantilever portion 27. As shown in FIG. 2, typical final dimensions of cantilever portion 27 are: length l≈0.05 cm, width w≈0.007 cm, and thickness τ≈$5 \times 10^{-5}$ cm. Note, silver paint 30, as used in the preferred embodiment, serves a secondary purpose of ensuring an electrical connection between configuration 12 and collar 24. However, any epoxy or other adhesive could probably be used so long as there remains a conductive electrical connection between configuration 12 and collar 24.

To scan a sample 16, collar 24 with coaxial cantilever-tip configuration 12 mounted therein, is mounted in insulating disk 22 in support structure 11 of microscope 10 in an orientation that is substantially perpendicular to the surface of sample 16, as shown in FIG. 2. The present invention utilizes standard mechanisms for sample and tip movement as described below. Sample 16 is mounted on stage 14 and is raster scanned (rastered) under tip portion 26 in the X-Y plane by means of a piezo-electric-tube (PZT) drive 18 which is shown as attached to microscope 1O in FIG. 1. A means of positioning sample 16 in proper non-contact responsive relationship to tip portion 26 includes a differential micrometer 20 which is used for coarse vertical approach (along the Z-axis), with a single PZT drive 19 for fine vertical adjustments (both of which are also shown in FIG. 1).

Referring again to FIG. 2, further details of-the operation of coaxial cantilever-tip configuration 12 are shown. Deflections of configuration 12 may be sensed using any of a plurality of standard techniques or means, such as the original Binnig tunneling current measurement assembly, or optical reflection measurement assembly, or optical interferometry measurement assembly (none of which are shown here), but for reasons of compactness and versatility, the present embodiment uses a simple capacitive means, as described in Simpson et al., *Rev. Sci. Instru.*, Vol. 48, page 1392 (1977), and incorporated herein by this reference thereto. The capacitance between cantilever-tip configuration 12, and capacitance probe 28 held near configuration 12, forms part of an LC circuit coupled to an RF oscillator (not shown). Motion of cantilever-tip configuration 12 with respect to stationary capacitance probe 28 changes the capacitance of the LC circuit, and thereby varies the frequency of the oscillator, which is then detected and measured by an FM tuner ( not shown ).

The mechanical resonance of the cantilever-tip configuration 12 may be excited parametrically by oscillating vertical PZT 19 up-and-down at twice the resonance frequency of cantilever-tip configuration 12, or electrostatically with an oscillating voltage across the gap between configuration 12 and capacitance probe 28 at one-half the mechanical resonance frequency of cantilever-tip configuration 12. Resonance is maintained using a common 2-phase lock-in amplifier and feedback circuit (not shown). Amplitude and frequency of oscillation of cantilever portion 27 are extracted directly from the lock-in amplifier, which are then recorded and plotted as a function of the X- and Y-position of sample 16. Again, well known graphical imaging means (also not shown) may be used to record and/or display the capacitance data in understood fashion. As mentioned above, the measuring and display devices may be used separately or the data combined for display on a single device. These methods for capacitance retrieval, cumulation and display whether from singular or dual inputs are well known or are simply achievable and need not be described further herein.

Figure 3A:
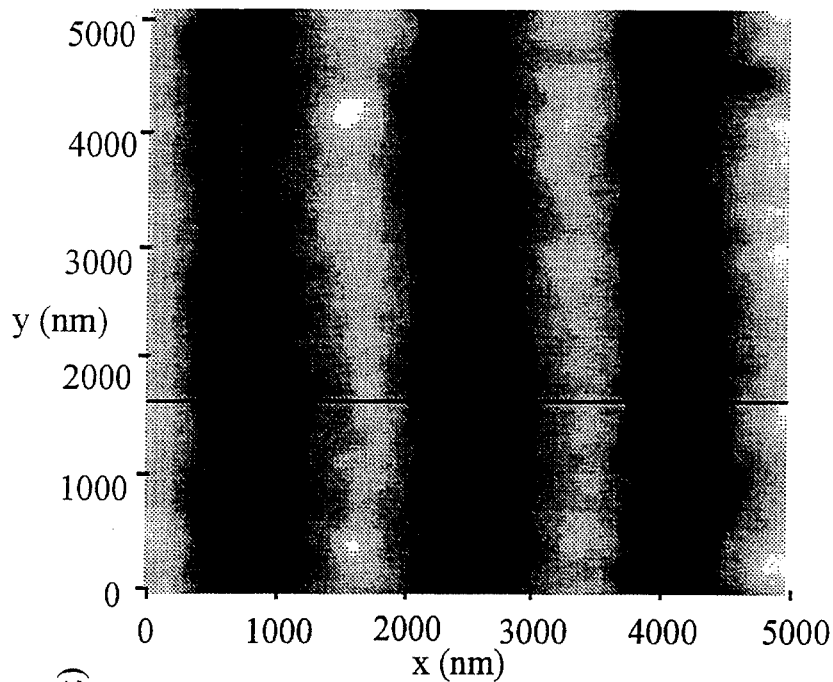
FIG. 3(a) is a magnetic force image of a recorded region of VHS video tape.
Figure 3B:
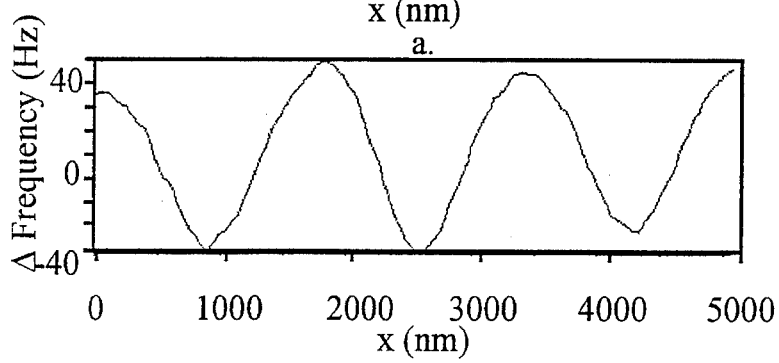
FIG. 3(b) shows the measured magnetic contrast profile along a line of image 3(a)
Figure 3C:
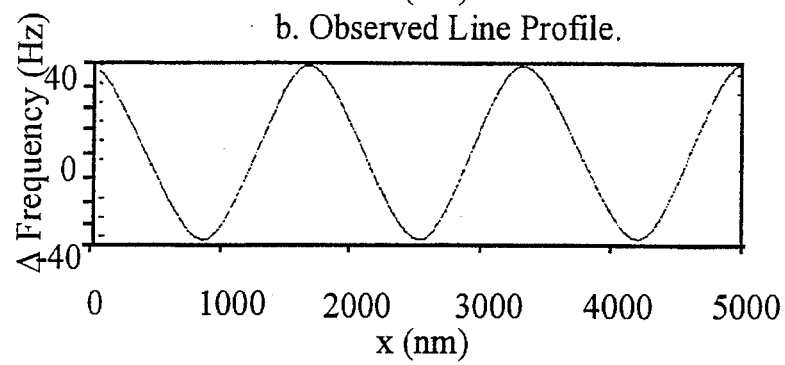
FIG. 3(c) shows the calculated magnetic contrast profile for the conditions of FIG. 3(b)

Referring now to FIGS. 3(a)-3(c), a profile of the magnetic forces between tip portion 26 and a sample 16 under study may be generated by measuring changes in the mechanical resonance frequency of the oscillating coaxial cantilever-tip configuration 12 while rastering sample 16 on stage 14. FIG. 3(b) shows that measured variations in the resonance frequency as a function of position along a single line of the image in FIG. 3(a). FIG. 3(c) shows expected or calculated variations in the resonance frequency as a function of position along a single line of the image in FIG. 3(a), according to the calculations set forth below.

Motion of cantilever-tip configuration 12 is detected by variations in the capacitance between cantilever portion 27 and capacitance probe 28. Changes in the mechanical resonance frequency and position of cantilever-tip configuration 12 are detected as a function of sample 16 position. These changes correspond to the forces and force gradients of sample 16 acting on configuration 12. Again, a second capacitance probe (not shown) could be introduced to simultaneously measure the motion of cantilever-tip configuration 12, and hence the forces and force gradients from the sample in an independent direction. Thus, in this alternative embodiment, two capacitance probes may be positioned at ninety degrees relative to each other, and cooperate to measure deflections representing multiple independent components of sample forces acting on configuration 12.

The present invention is especially effective when operated as a non-contact force microscope 10, with tip portion 26 held at distances of 1–100 nm from sample 16. If tip portion 26 is made from a magnetized material, the invention allows measurements of magnetic forces acting on tip portion 26 resulting from the interaction between tip portion 26 and the magnetic fields of sample 16.

In the preferred embodiment of the present invention, an ultra-small cantilever spring constant is vital for maximum force sensitivity. The spring constant for a rectangular cantilever portion 27 may be calculated from $k=E\tau^3w/4l^3$. (See: *Shock and Vibration Handbook* $2^{nd}$ edition, pgs. 7–11 to 7–16, edited by C. M. Harris and C. E. Crede, McGraw-Hill, New York (1976)). Using a typical width (w=0.006 cm), thickness ($\tau=3\times10^{-5}$ cm), and length (l=0.05 cm) of a cantilever portion 27 of the present embodiment of the invention, and the elastic modulus of nickel $E=2.07\times10^{12}$ dyne/cm$^2$, a characteristic spring constant is calculated to be:

$$k \approx 1 \text{ dyne/cm} = 1\times10^{-3} \text{ N/m}.$$

This is an order of magnitude smaller than previously reported "soft" cantilever force microscopes, and nine orders of magnitude less than the quartz crystal cantilever system of Pohl.

An experimental value for the effective spring constant may be determined from the mechanical resonance frequency of cantilevertip configuration 12. Assuming a uniform cantilever portion 27, with mass-per-unit-length $\lambda=w\tau\rho$ (where the mass density is $\rho=8.9$ g/cm$^3$ for nickel), an unperturbed cantilever-tip configuration 12 of length l has a resonance frequency of $f_0=[0.16152(\tau)/l^2](E/\rho)^{1/2}$. (See: *Shock and Vibration Handbook* $2^{nd}$ edition, pgs. 7–11 to 7–16, edited by C. M. Harris and C. E. Crede, McGraw-Hill, New York (1976).) Thus, replacing the cantilever thickness (which is usually the most difficult parameter to measure accurately) by $\tau=(f_0l^2/0.16152)(\rho/E)^{1/2}$, the spring constant of cantilever-tip configuration 12 ($k=E\tau^3w/4l^3$) may be written $k=(f_0l)^3w\rho(\rho/E)^{1/2}/0.01686$. Using measured values for the length (l=0.05 cm), width (w=0.006 cm) and resonant frequency (1,100 Hz) of a particular cantilever portion 27, with the known mass density ($\rho=8.9$ g/cm$^3$) and elastic modulus ($E=2.07\times10^{12}$ dyne/cm$^2$) of nickel, an experimental value for the effective spring constant is $$k \approx 1 \text{ dyne/cm} = 10^{-3} \text{ N/m},$$

which agrees with the theoretically determined value given above.

Perhaps the most relevant technique for calibrating the sensitivity of coaxial cantilever-tip configuration 12 is to measure the frequency change from a known applied force, which can then be compared to the expected frequency change for an idealized cantilever portion 27. Expected frequency changes may be calculated by analyzing all of the forces acting on cantilever portion 27 and tip portion 26, but it is perhaps simpler to use an energy analysis. For simple linear (elastic) forces that obey Hooke's law (generally valid for small displacements), the virial theorem states that the time-averaged kinetic energy equals the time-averaged potential energy: $<T>=<V>$. Furthermore, for such linear forces, the average of the sum of internal elastic energy plus external potential energy is equal to the sum of the average: $<V>=<V_0+V_E>=<V_0>+<V_E>$. Thus, if the oscillation amplitude is held constant so that the average internal elastic energy of cantilever-tip configuration 12 is constant, then variations in the mechanical resonance frequency (which change the average kinetic energy) are due primarily to changes in the interaction potential energy $\delta<T>=\delta<V_E>$.

Assuming that the time-dependent displacement at tip portion 26 is $\delta X_t = A\cos(2\pi f_0 t)$, where A is an amplitude of oscillation, the lateral motion at a distance Z from the cantilevered end is:

$$\delta X = \frac{\delta X_t}{2}\left[\left(\cosh\frac{Z}{Z_0}-\cos\frac{Z}{Z_0}\right) - 0.73410\left(\sinh\frac{Z}{Z_0}-\sin\frac{Z}{Z_0}\right)\right]$$

where $Z_0=l/1.875$. Using $<\sin^2(2\pi f_0 t)>=<\cos^2(2\pi f_0 t)>=\frac{1}{2}$, the time average kinetic energy is found by integrating $\frac{1}{2}\lambda \dot{x}^2$ over the length of cantilever portion 27 $<T>=$ $0.0625\lambda l(2\pi fA)^2$, and the expected resonant frequency becomes $f^2 = f_0^2 + 4 < V_E > /(\lambda l \pi^2 A^2)$. For small external forces, the change in the resonant frequency is $\Delta f = f - f_0 \approx 2 < V_E > /(f_0 \lambda l \pi^2 A^2)$. To lowest order, only potential energy terms which are quadratic in tip displacement contribute to a frequency shift, i.e. terms for which $V_E \propto (\delta X)^2$. Contributions to $< V_E >$ come from forces along the axis of cantilever portion 27, and force gradients in the direction of cantilever oscillation. In contrast to prior art horizontally disposed cantilever-tip configurations, whose mechanical resonance frequency is sensitive primarily to vertical force gradients, the present invention, with a vertically disposed coaxial cantilevered-tip configuration 12, is sensitive to vertical forces and horizontal force gradients.

As an example, consider the frequency shift due to gravity. For a horizontal cantilever (not shown), the average potential energy from time spent above equilibrium is equal and opposite to that from time spent below equilibrium, hence $<V_E> = 0$; the resonance frequency of a horizontal cantilever is not sensitive to gravity since the gravitational force has negligible gradient. This behavior is verified by orienting the invention so that the cantilever is horizontal. To within experimental resolution, the cantilever resonance frequency does not depend on the angle of rotation about the horizontal axis.

For a vertically hanging cantilever portion 27 (anchored at its top, as described herein), the minimum in $V_E$ occurs at equilibrium, when cantilever portion 27 hangs straight down. When oscillated about equilibrium, an element of mass at Z rises a distance $\delta Z = \int_0^z dl - Z$ where the cantilever element of length is $dl = \sqrt{1 + [d(\delta X)/dZ]^2} dZ$. For small oscillations $dl \approx \{1 + \frac{1}{2}[d(\delta X)/dZ]^2\} dZ$ gives $<V_E> = \lambda g < \int_0^l (\delta Z) dZ > = \lambda g \pi A^2 / 32$, or $\Delta f \approx g/(16\pi l f_0)$. For a typical cantilever portion 27 of length $l = 0.05$ cm, which had a resonance frequency of $f_0 = 1,100$ Hz, the calculated frequency change when the cantilever is rotated to lie horizontally is $\Delta f = 0.35$ Hz, in good agreement with the measured decrease of $\Delta f = 0.38 \pm 0.05$ Hz. In principle, the elastic forces of a vertically hanging cantilever portion 27 may be reduced further until gravity provides the dominant restoring force, but noise and scan-rate considerations limit the practicality of such low-frequency oscillations. The fact that one can readily measure changes in the mechanical resonance frequency due to gravity verifies that cantilever portion 27 is nearing the theoretical limit for minimal restoring force. It is problematic to use such soft cantilevers, which sag under their own weight, in a microscope with a cantilever that is oriented substantially parallel to the sample's surface, as in the original Binnig AFM.

The coaxially cantilever-tip configuration 12 is exceptionally sensitive to force interactions between tip portion 26 and sample 16, thus it is ideally suited for measuring long-ranged forces at non-contact distances. One example, as described below, is the microscopic magnetic forces between a magnetized sample 16 and a magnetized tip portion The magnetostatic potential of a point dipole in a magnetic field is $V_E = -m \cdot H$. For a dipole of magnitude $m_0$ aligned upward along the axis of tip portion 26 $m = m_0 (-\sin\theta, 0, \cos\theta)$. For small displacements from equilibrium ($\delta X$ and $\delta Z$), the angle tip portion 26 makes with respect to the (vertical) Z-axis is $\theta \approx dX/dZ = 1.3764 \delta X/l$. Significant terms in a Taylor-series expansion of the magnetic field are $H \approx H_0 + (\partial H/\partial X)\delta X_t + (\partial H/\partial Z)\delta Z_t + \frac{1}{2}(\partial^2 H/\partial X^2)(\delta X_t)^2$. At tip portion 26, the X-displacement $(\delta X_t)$ ranges between $-A$ and $+A$, whereas the Z-displacement is $\delta Z_t = \frac{1}{2} \int_0^{l/Z_0} (dX/dZ)^2 dz = 0.58088 (\delta X)^2/l$. Quadratic terms in the potential which survive time-averaging are $$V_E = m_0 \left[ \frac{1}{2} \frac{\partial^2 H_z}{\partial x^2} (\delta x_t^2) + \frac{\partial H_z}{\partial z} (\delta z_t) - \frac{\partial H_x}{\partial x} (\delta x_t \theta) - \frac{1}{2} H_{0z}(\theta^2) \right]$$

which then leaves $$\Delta f = \frac{m_0}{2 f_0 \lambda \pi^2 l} \left[ \frac{\partial^2 H_z}{\partial x^2} + 1.1618 \frac{\partial (H_z/l)}{\partial z} - 2.7528 \frac{\partial (H_x/l)}{\partial x} - 1.8945 \frac{H_z}{l^2} \right]$$

Magnetic structures of size $\gamma$ generally have stray fields which vary over length scales of order $\gamma$, so that $\gamma^2 (\partial^2 H_z/\partial z^2) \sim \gamma (\partial H_z/\partial z) \sim H_{0z}$. Thus, microscopic magnetic structures with $\gamma \ll l$ have $l^2 \partial^2 H_z/\partial x^2 \gg l \partial H_z/\partial z \gg H_{0z}$, and the dominant term which contributes to observed frequency change is $\Delta f \approx m_0 (\partial^2 H_z/\partial x^2)/(2 f_0 \lambda \pi^2 l)$.

The magnetic microstructure of the longitudinally polarized video signal on pre-recorded VHS magnetic tape was measured. The magnetic tape is comprised of a layer of $Fe_2O_3/Co$ compound on a mylar substrate. Force microscopy of this tape reveals a uniformly rough surface with no large scale features. When viewed with the MFM of the present invention, as shown in FIG. 3(a), the magnetic bit structure is clearly visible. To model this image, we first consider a single arctangent magnetic transition (reorientation of the magnetization) from $-M_r \hat{x}$ to $M_r \hat{x}$, over the transition width (a) centered about $x=0$, recorded to a depth ($\delta$) in the magnetic media. Assuming that the bits are much longer (Y-axis) than they are wide (X-axis), the demagnetization field and derivatives of interest are:

$$H_z(x,y) = 4 M_r \log \left( \frac{x^2 + (\delta + z + a)^2}{x^2 + (z + a)^2} \right)$$

$$\frac{\partial H_x}{\partial x} = 4 M_r \left( \frac{(z+\delta)(-x^2 + a^2 + a(z+\delta))}{(x^2 + a^2)[(z+\delta+a)^2 + x^2]} - \frac{z(-x^2 + a^2 + az)}{(x^2 + a^2)[(z+a)^2 + x^2]} \right)$$

$$\frac{\partial H_z}{\partial z} = 4 M_r \left( \frac{a + \delta + z}{x^2 + (a + \delta + z)^2} - \frac{a + z}{x^2 + (a + z)^2} \right)$$

$$\frac{\partial^2 H_z}{\partial x^2} = 4 M_r \left( \frac{x^2 - (a + z)^2}{[x^2 + (a + z)^2]^2} - \frac{x^2 - (a + \delta + z)^2}{[x^2 + (a + \delta + z)^2]^2} \right)$$

See: R. I. Potter, *J. Appl. Phys.* 41, 1648 (1970) and D. Rugar, H. J. Mamin, P. Guenther, S. E. Lambert, J. E. Stern, I. McFadyen, and T. Yogi, *J. Appl. Phys.* 68, 1169 (1990).

For a vertically cantilevered tip portion 26, the dominant contribution to magnetic contrast for small magnetic structures comes from the integral of a $\partial^2 H_z/\partial x^2$ over the volume of tip portion 26. Assuming a tip portion 26 of macroscopic height, with a cross-section that never decreases with increasing height, the volume integral may be converted to an integral over the surface of tip portion 26 using $\partial^2 H_z/\partial x^2 = -\partial^2 H_z/\partial z^2$:

$$I = \iint \left[ \int_z^\infty \frac{\partial^2 H_z}{\partial x^2} dz' \right] dx \, dy = \iint \left[ \frac{\partial H_z}{\partial z} \right] dx \, dy$$

For a cone-shaped tip portion 26, this surface integral contains terms which do not depend on lateral position, including a term which diverges logarithmically with the height of the cone. These terms, however, do not contribute to the lateral resolution and hence may be ignored as a constant background frequency shift. For a cone of half-angle α, centered a distance $x_0$ from the transition at a height $z_0$ above the magnetic media, the spatially dependent components which contribute to contrast are:

$$\frac{I(x_0, z_0)}{4\pi M_r \sin^2\alpha \cos\alpha} = \ln\frac{[(a+\delta+z_0)^2 + x_0^2]^{a+\delta+z_0}}{[(a+z_0)^2 + x_0^2]^{a+z_0}} +$$

$$2x_0\tan^{-1}\frac{x_0\delta}{(a+z_0)(a+\delta+z_0) + z_0^2}$$

The term in $I(x_0,z_0)$ which diverges logarithmically with $x_0^{2\delta}$ may be removed by considering multiple transitions with alternating orientation. For the frequency modulated luminescence signal in VHS recording technology, bits have alternating orientation with widths W=0.5–0.8 μm. Assuming constant bit width, the net frequency shift becomes:

$$\Delta f(x_0, z_0) = \frac{m_0}{2f_0\lambda\pi^2 l} \sum_{n=-\infty}^{+\infty} (-1)^n I(x_0 + nW, z_0)$$

Using appropriate values for the length l=0.05 cm, conic angle 2α=10°, unperturbed resonance frequency $f_0$=1 kHz, scan height $z_0$=500 nm, and magnetization density $m_0$=500 emu/cm$^3$ of nickel; as well as reasonable values for recording depth δ=50 nm, transition width a=300 nm, bit width W=0.83 μm, and media magnetization Mr=500 emu/cm$^3$, qualitative and quantitative agreement between observed (FIG. 3(b)) and calculated (FIG. 3(c)) magnetic contrast are obtained.

Figures 4A, 4B:
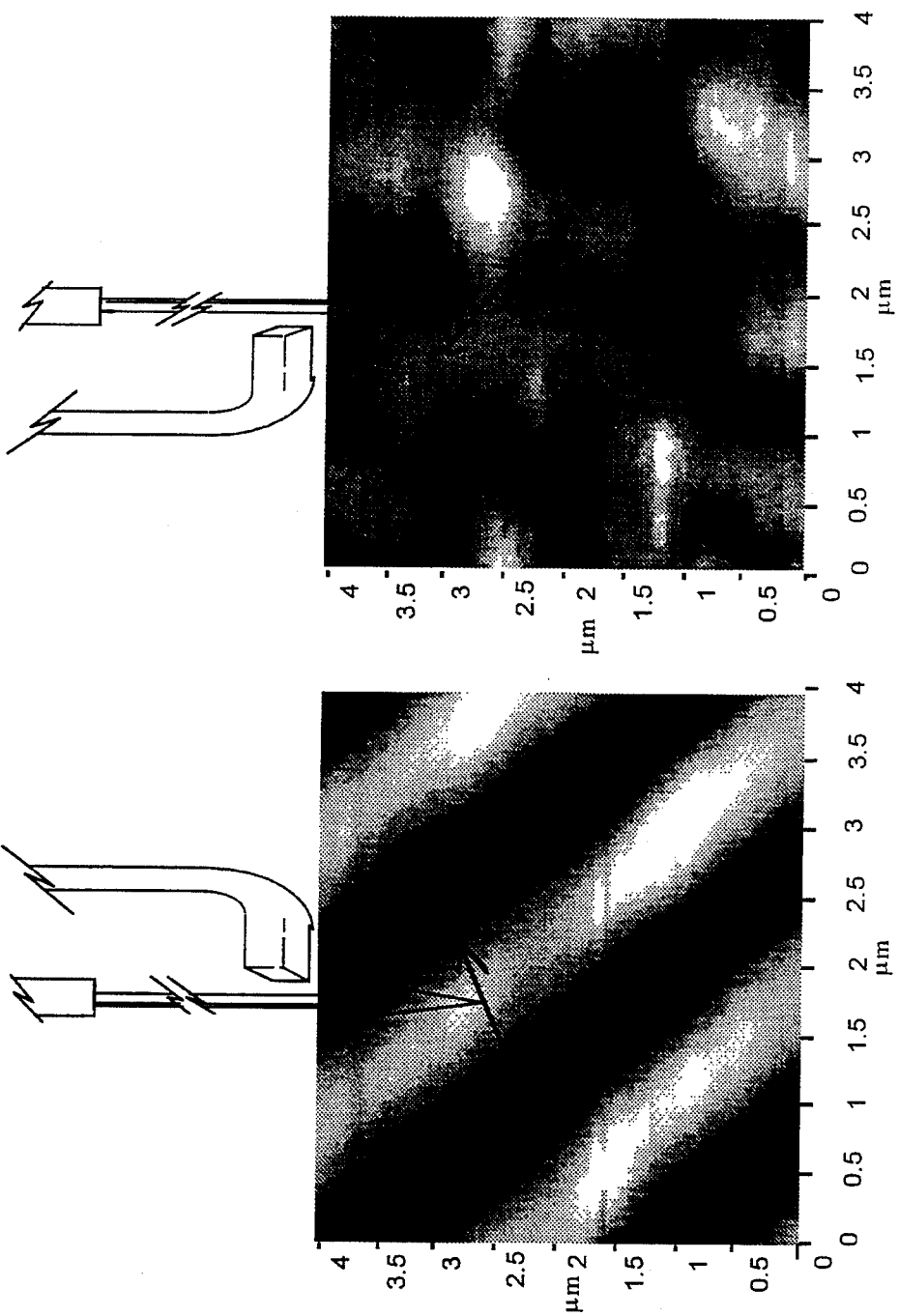
FIG. 4(a) shows a magnetic force image of a recorded region of VHS video tape, obtained with the microprobe tip vibrated in a direction perpendicular to the magnetic transitions.
FIG. 4(b) shows a magnetic force image of a recorded region of VHS video tape, with the microprobe tip vibrated in a direction parallel to the magnetic transitions.

Referring to FIGS. 4(a)–4(b), the intrinsic capabilities for coaxial cantilever-tip configuration 12 to resolve directional information are demonstrated. In essence, a single magnetic transition is a line where two rows of oppositely oriented magnetic dipoles meet. For example, one row has all their poles pointing in one direction [e.g. north (N) in the +x direction], while the other row has its poles oriented in the opposite direction (N in the −x direction), so that the transition is a line between two rows of N poles. An opposite transition occurs along the line between two south (S) poles. Considerable magnetic flux is expelled out of the recording media along the line where the N poles meet, and this magnetic flux is returned back into the media along the line where the S poles meet. In VHS technology, changes in the distance between these transitions are converted into a frequency modulated signal that contains the recorded video image. FIG. 4(a) is an image of VHS recorded tape taken with tip portion 26 oscillating in the X-direction (perpendicular to the transition lines) demonstrating a large contrast due to the large changes in the magnetic force as the magnetic field makes transitions from the +x direction to the −x direction. FIG. 4(b) is an image of a similarly recorded region of the VHS tape, but with tip portion 26 oscillating in the Y-direction (parallel to the transition lines) revealing only small changes in the magnetic fields along the transitions. The contrast between FIGS. 4(a) and 4(b) demonstrate the high sensitivity of coaxial cantilever-tip configuration 12 for resolving directional information.

The mechanism for directional contrast demonstrated in FIGS. 4(a)–(b) is intrinsic, hence it does not require a special orientation of the magnetized tip. Similar contrast between force-gradients in the X- and Y-directions may be obtained when operated as a general purpose non-contact force microscope be. The original Binnig configuration, with the cantilever oriented parallel to the sample's surface, cannot resolve differences in the X- and Y- force gradients since the tip can only be vibrated in the Z-direction (normal to the sample). A further intrinsic advantage of coaxial cantilever-tip configuration 12 is that, if a second capacitance probe (or other independent vibration detection system) were installed, it would be possible to measure motion of cantilever portion 27 simultaneously in the X- and Y-directions, allowing concurrent detection of both lateral components of the force gradient.

Figure 5:
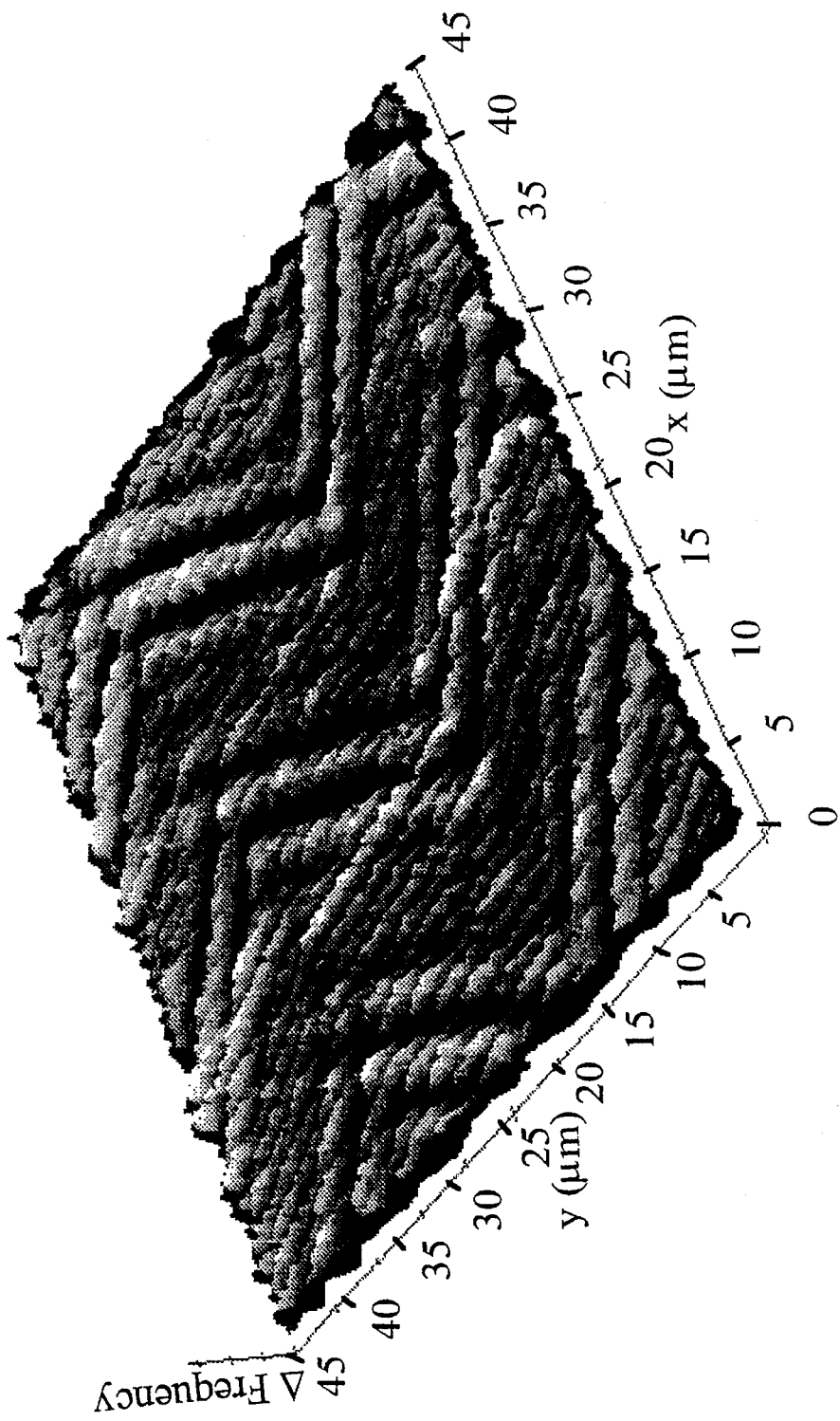
FIG. 5 shows a large area magnetic force image of the superposed audio and video signals on a region of s-VHS video tape.

Referring to FIG. 5, yet another intrinsic advantage of coaxial cantilever-tip configuration 12 can be seen. In s-VHS technology the density of recorded information is increased by superimposing a high-fidelity sound signal onto a standard VHS video signal. The sound signal is recorded at a lower frequency, so that it is embedded deeper into the magnetic recording media, essentially utilizing all three dimensions of the media. The resulting recorded structure is quite complex, making it difficult to resolve using previous techniques for magnetic microscopy. Since coaxial cantilever-tip configuration 12 is vibrated laterally over the sample's surface, it is ideally suited for resolving changes in the magnetic field as a function of lateral position over the magnetic recording media, which is most closely related to the signal that is sensed by a magnetic read head. In FIG. 5 it is shown that, even when scanned over a large scale, a microscope 10 employing the present invention is able to clearly resolve all of the complex structures of the s-VHS recording.

Figure 6:
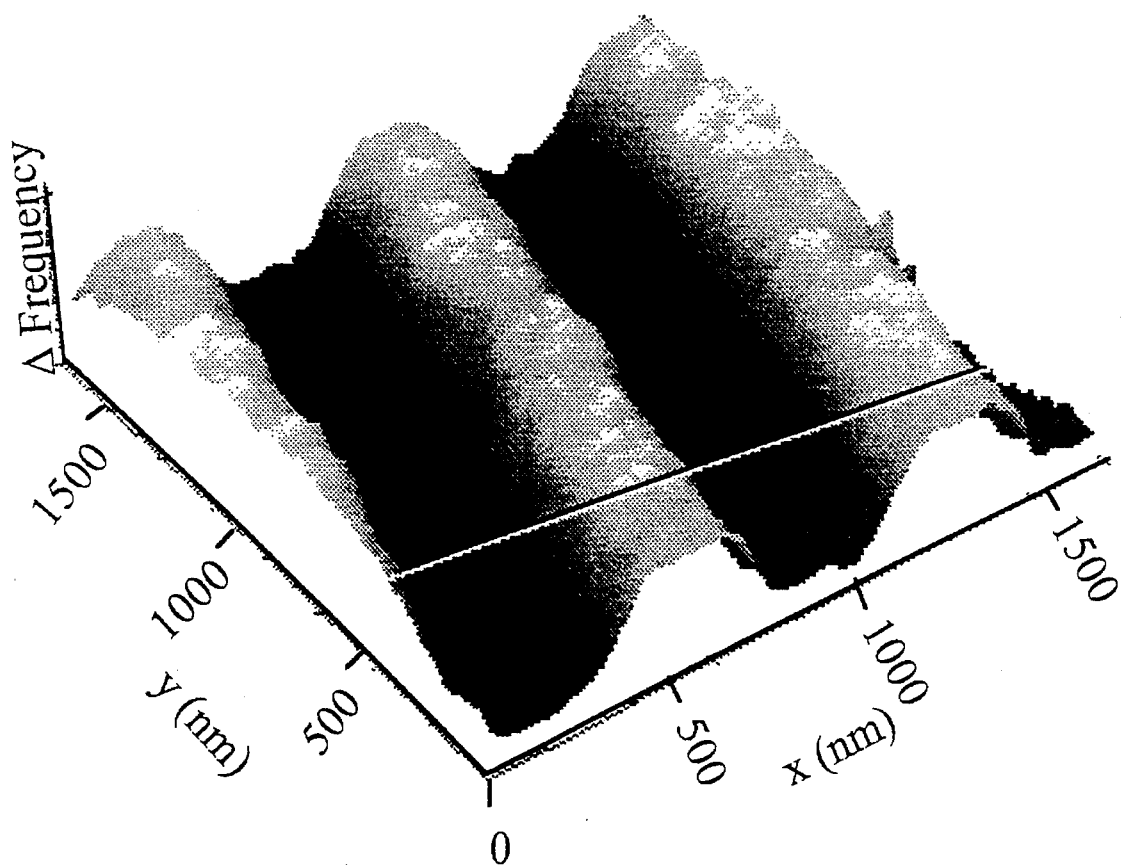
FIG. 6 shows a high resolution magnetic force image of high-density (0.35 μm period) recorded magnetic transitions.

Magnetic microstructures small enough to clearly establish the ultimate resolution of force microscope 10 of the present invention have not yet been examined. Nevertheless, close examination of magnetic force images from the VHS recording tape (FIG. 6), reveals structure indicative of the individual magnetic particles which comprise the magnetic recording media. This shows that the resolution of the present invention significantly exceeds the typical particle diameter of ~100 nm; this simple tabletop force microscope 10, used as an MFM, provides unexpected resolution on the order of 10 nm, comparable to highly sophisticated, state-of-the-art magnetic force microscopes.

From the foregoing, it is readily apparent that a useful embodiment of the present invention has been herein described and illustrated which fulfills all of the aforestated objectives in a remarkably unexpected fashion. It is, of course, understood that such modifications, alterations and adaptations as may readily occur to the artisan confronted with this disclosure are intended within the spirit of this disclosure which is limited only by the scope of the claims appended hereto.

Accordingly we claim:

1. A cantilever-tip configuration for use in a non-contact force microscope for measuring selected forces and force gradients of a sample, said configuration comprising an elongated cantilever portion and a sharpened tip portion operatively associated with and disposed in substantially coaxial relationship with said cantilever portion.

2. A cantilever-tip configuration according to claim 1 in which said cantilever portion and said tip portion are formed from a single piece of wire, said tip portion being disposed at one end of said wire, and having means for operatively installing said configuration in a non-contact force microscope.

3. A cantilever-tip configuration according to claim 1 in which the geometry of said configuration inhibits axial deflections toward said sample.

4. A cantilever-tip configuration according to claim 3 in which said cantilever portion has a low static spring constant.

5. A cantilever-tip configuration according to claim 1 further comprising means for measuring deflections of said configuration in response to selected forces and force gradients of said sample.

6. A cantilever-tip configuration according to claim 5 in which said means for measuring deflections of said configuration comprises a capacitance measurement assembly.

7. A cantilever-tip configuration according to claim 2 in which said wire is nickel.

* * * * *